United States Patent [19]

Orfeo et al.

[11] 4,303,536

[45] Dec. 1, 1981

[54] NONAZEOTROPIC REFRIGERANT COMPOSITION CONTAINING MONACHLORODIFLUOROMETHANE, AND METHOD OF USE

[75] Inventors: Sabatino R. Orfeo, Orchard Park; Robert A. Allen, Kenmore; Leonard I. Stiel, Mineola; John W. Pelava, Buffalo, all of N.Y.

[73] Assignee: Allied Corporation, Morris Township, Morris County, N.J.

[21] Appl. No.: 221,154

[22] Filed: Dec. 29, 1980

[51] Int. Cl.³ .............................................. C09K 5/04
[52] U.S. Cl. ............................... 252/67; 252/DIG. 9; 252/78.1; 252/305; 252/364; 62/114; 203/67; 203/70

[58] Field of Search ................... 252/67, DIG. 9, 305, 252/364, 78.1; 203/67, 70; 62/114

[56] References Cited

U.S. PATENT DOCUMENTS 3,336,763  8/1967  Lunde .............................. 252/67 X
3,607,755  9/1971  Murphy et al. ........................ 252/67

*Primary Examiner*—Mayer Weinblatt
*Attorney, Agent, or Firm*—Arthur J. Plantamura; Jay P. Friedenson

[57] ABSTRACT

A novel nonazeotropic mixture containing R-22 and either R-124 or R-152a. This mixture has an improved efficiency in cooling and heating applications. Also provided is a method for producing refrigeration and a method for producing heating using this mixture.

10 Claims, 1 Drawing Figure

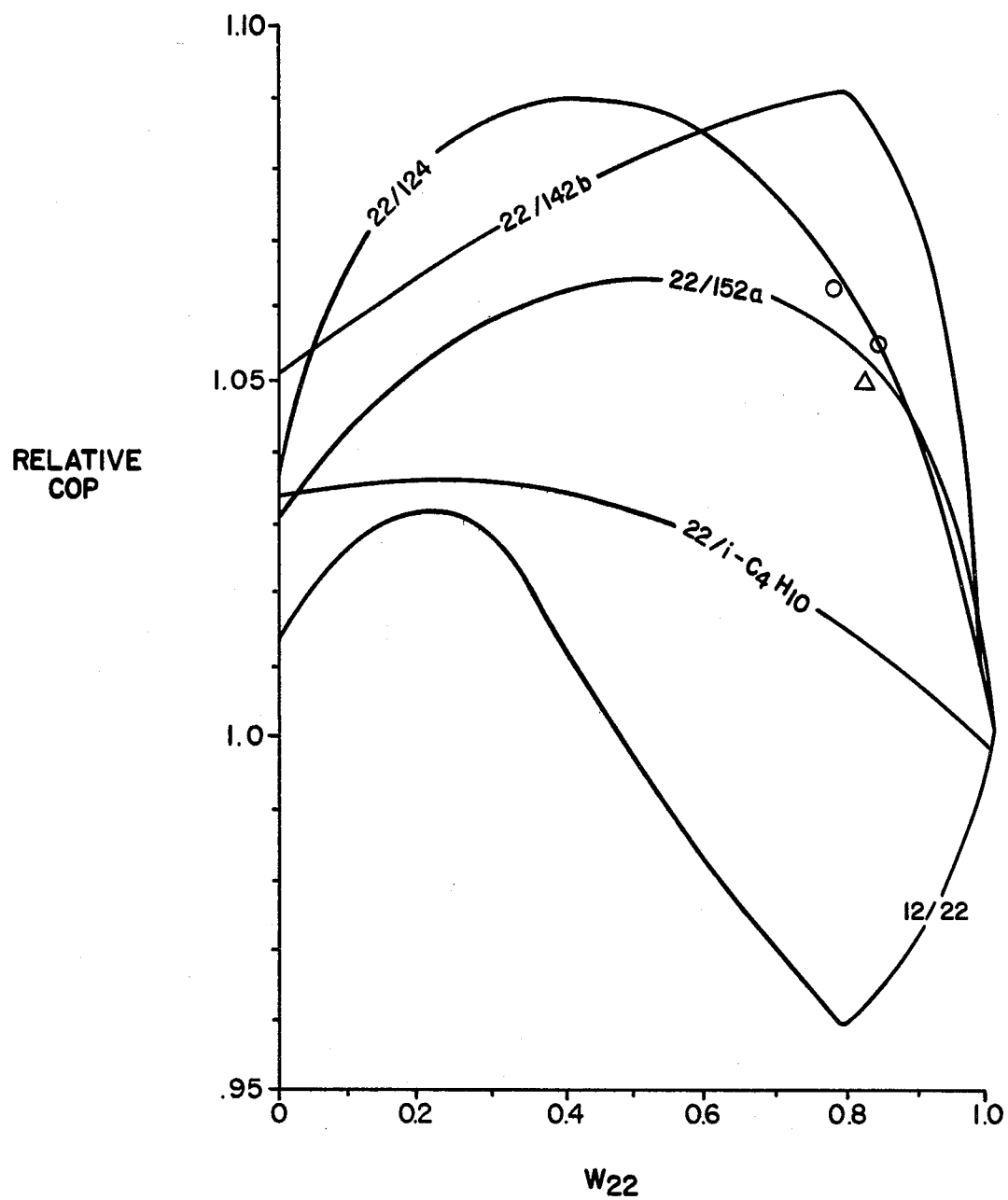

NONAZEOTROPIC REFRIGERANT COMPOSITION CONTAINING MONACHLORODIFLUOROMETHANE, AND METHOD OF USE

TECHNICAL FIELD

This invention relates to refrigerant compositions having improved efficiencies for cooling and heating applications, and specifically relates to nonazeotropic refrigerant compositions of this type.

BACKGROUND ART

Most commercial refrigerants are pure fluids or azeotropes. Many refrigerant compositions are known in the prior art, with a listing of standard refrigerants being found in U.S. Pat. No. 3,362,180 to Eiseman, Jr. This listing includes R-22, which is monochlorodifluoromethane. Nonazeotropic refrigerant mixtures containing R-22 are known in the prior art, as illustrated by V. F. Chaykovskiy, A. P. Kuznetsov and I. V. Volobuyev, *Kholod. Tekh. Tekhnol.*, No. 15, pp. 56–61 (1972) and *Research Disclosure*, pp. 13–14 (June 1976), cited in *Chemical Abstracts* at 86:170760. The Chaykovskiy publication discusses nonazeotropic mixtures of R-22 with each of R-12, R-13 V1 and R-142 for use in compression-type refrigerators, and the *Research Disclosure* publication shows mixtures of R-22 with each of R-142b, R-32, R-125, R-123 and propane.

However, the prior art of which we are aware fails to provide a unique nonazeotropic refrigerant composition containing R-22 and either R-124 or R-152a and having a remarkably high coefficient of performance (COP) with only a small sacrifice in capacity. This prior art also is deficient since it does not provide a composition of this type which has the advantage of producing higher outlet temperatures for the heated condenser fluid, when used in heating applications. A further deficiency is that it does not provide a nonflammable composition of this type. Also, this prior art fails to provide a method for refrigerating or heating using this unique refrigerant composition.

DISCLOSURE OF THE INVENTION

It is accordingly one object of the present invention to provide a unique nonazeotropic refrigerant composition containing R-22 and either R-124 or R-152a and having a remarkably high coefficient of performance with only a small sacrifice in capacity.

A further object of the present invention is to provide a composition of this type which has the advantage of producing higher outlet temperatures for the heated condenser fluid, when used in heating applications.

A still further object is to provide a refrigerant composition of this type that is nonflammable.

An even further object is to provide a method for refrigerating or heating that uses this unique refrigerant composition.

Other objects and advantages of the present invention will become apparent as the description thereof proceeds.

In satisfaction of the foregoing objects and objectives, there is provided by this invention a nonazeotropic refrigerant composition. This refrigerant composition includes about 99 to 1 wt. % of monochlorodifluoromethane, as a first component, and about 1 to 99 wt. % of a polar fluorocarbon as a second component. The polar fluorocarbon is either 2-chloro-1,1,1,2-tetrafluoroethane or 1,1-difluoroethane. Also provided by this invention is a method for producing refrigeration that includes condensing this refrigerant composition and thereafter evaporating the composition in the vicinity of a body to be cooled. Finally, there is provided a method for producing heating that involves condensing this refrigerant composition in the vicinity of a body to be heated and thereafter evaporating the refrigerant composition.

BRIEF DESCRIPTION OF THE DRAWING

Reference is hereby made to the accompanying figure which forms a part of the specification of the present invention. This figure depicts the relationship between relative COP and the weight percent of R-22 in certain refrigerant compositions.

BEST MODE FOR CARRYING OUT THE INVENTION

The refrigerant composition of the present invention is useful in compression cycle applications including air conditioner and heat pump systems. This refrigerant composition contains two fluorocarbons that form a nonazeotropic mixture. One of these fluorocarbons is monochlorodifluoromethane ($CHClF_2$), which is known as and is hereinafter called R-22. The other fluorocarbon is either 2-chloro-1,1,1,2-tetrafluoroethane ($CHClFCF_3$), which is known as and is hereinafter called R-124, or 1,1-difluoroethane ($CH_3CHF_2$), which is known as and is hereinafter called R-152a.

The drawing represents our discovery as to the remarkably high coefficient of performance that results from combining R-22 with either R-124 or R-152a. Specifically, this drawing shows the relationship between relative COP and the weight percent of R-22 in a refrigerant composition containing R-22 and either R-124 or R-152a. With reference to the drawing, it can be seen that as either R-124 or R-152a is added to R-22, there is observed a marked increase in relative COP, with pure R-22 having a relative COP of 1.0. The drawing further shows that a maximum in relative COP results when the weight percent of R-124 or R-152a becomes larger, that is, about 60% of R-124 or about 50% of R-152a. The curves in the drawing represent values obtained for cooling mode conditions in which the inlet evaporator temperature is 7.22° C. and the condenser temperature is 43.33° C. Comparable curves would be obtained for the heating mode using these same two temperatures. Curves similar to those in the drawing would be obtained using a different inlet temperature and a different condenser temperature.

The drawing also illustrates that is it unpredictable whether a particular nonazeotropic mixture will have improved decreased efficiency for cooling and heating applications. For example, the difference between the boiling points of the particular components of a nonazeotropic mixture is not determinative, and neither is the boiling point of the component added to R-22. In the drawing, nonazeotropic mixtures of R-22 and R-124, R-22 and R-152a, and R-22 and R-12, and R-22 and isobutane are shown. R-22 has a boiling point of −40.78° C., R-124 of −12.0° C., R-152a of −24.67° C., R-12 of −29.78° C. and isobutane of −10.0° C. The differences in the boiling points with R-22 are 28.78° C., 16.11° C., and 30.78° C., respectively. The first two values are for the mixtures of the present invention, and one of the second two values is for a known prior art mixture. Also shown in the drawing is a prior art nonazeotropic mixture containing R-22 and R-142b. R-142b has a boiling point of −11.0° C. R-142b presents a serious problem of toxicity.

In addition to providing a remarkably high relative COP, the refrigerant composition of the present invention has the advantage of producing higher outlet temperatures for the heated condenser fluid, when used in heating applications. This refrigerant composition results in improvements in efficiency of up to about 5 to 10% in the cooling mode and similar improvements in the heating mode.

For use in existing equipment, for either cooling or heating, it is preferred that the refrigerant composition has a high weight fraction of R-22 so that only moderate equipment modifications are required. A high weight fraction is very advantageously provided when the composition contains about 90 to 70 wt. % of R-22 and about 10 to 30 wt. % of the polar fluorocarbon. This composition has the further advantage of being nonflammable.

However, as can be seen from the drawing, a refrigerant composition containing from about 99 to 1 wt. % of R-22 and from about 1 to 99 wt. % of either R-124 or R-152a is suitable. The R-22/R-124 composition is nonflammable in this entire range. The optimum relative COP for this composition is possessed by a composition containing about 50 to 30 wt. % of R-22 and about 50 to 70 wt. % of R-124. The R-22/R-152a composition is flammable at low weight fractions of R-22. Thus, compositions containing low weight fractions of R-22 are generally less preferred.

The improved relative COP for the refrigerant composition of the present invention is higher than the linear combination of the values of the components and thus a synergistic effect is seen for this composition.

In the Table experimental cycle parameters for selected refrigerant compositions of the present invention are compared with the corresponding values obtained for R-22, using an inlet evaporator temperature of 7.78° C. and an inlet condenser temperature of 43.89° C. These parameters are relative COP, relative capacity, discharge temperature ($T_D$), temperature of the saturated vapor in the evaporator ($T_{EV}$), temperature of the constant temperature bath for the evaporator ($T_{EB}$), condenser outlet temperature ($T_{CO}$), temperature of the constant temperature bath for the condenser ($T_{CB}$), temperature of the constant temperature bath for the subcooler ($T_{SCB}$), evaporator pressure and condenser pressure.

From the Table, it can be seen that the selected refrigerant compositions, when compared to R-22, have 5 to 6% greater relative COP values and have improvements in the discharge temperature of up to 8.9° C., with a decrease in relative capacity of 7 to 11% and an evaporator temperature rise of about 2.2 to 3.3° C.

Further experimentation shows that the refrigerant composition containing R-22 and R-152a with a weight fraction of R-22 of 0.8 used in the Table produces a condenser outlet temperature of 42.78° C. and an improvement in efficiency of 4% relative to R-22, when a condenser bath temperature of 38.89° C. and a subcooler bath temperature of 31.67° C. is used, rather than the temperatures of 37.78° C. and 33.33° C., respectively, required for R-22.

The bath settings for the refrigerant composition indicate that moderate increases in heat transfer areas are required to obtain the necessary conditions for improved efficiencies. Although the mixture of R-22/152a results in less improvement in efficiency and in discharge temperature with a higher decrease in relative capacity than R-22/124, the required increase in heat transfer area is indicated to be small for this system.

The refrigerant composition of the present invention has desirable properties for use in compression cycle applications. As a result, this composition produces an improved performance compared to standard refrigerants. Although this composition results in a small decrease in capacity compared to R-22, pure fluids or azeotropes with considerably lower capacities would have to be used to obtain comparable improvements in capacity.

Because the refrigerant composition of the present invention is a nonazeotropic mixture, temperature differences on evaporation and condensation do result. Therefore, in order to obtain best results with this refrigerant composition, modifications are required in the equipment design, including the use of suitable heat exchangers.

The value of COP for heating mode conditions is 1+COP for cooling mode conditions (Heat Out/Work In). Therefore, with reference to the drawing, comparable improvements in efficiency are obtained for the nonazeotropic composition of the present invention if the system is operated with the same evaporator and condenser temperatures to provide heat from the condenser.

TABLE

| Fluid | Rel. COP | Rel. Cap. | $T_D$, °C. | $T_{EV}$, °C. | $T_{EB}$, °C. | $T_{CO}$, °C. | $T_{CB}$, °C. | $T_{SCB}$, °C. | $P_{EVAP}$ PSIA | $P_{COND}$ PSIA |
|---|---|---|---|---|---|---|---|---|---|---|
| R-22 | 1.0 | 1.0 | 108.89 | 7.78 | 18.33 | 43.61 | 38.89 | 31.67 | 90.5 | 239 |
| R-22/152a ($w_{22}$ = 0.8) | 1.05 | 0.89 | 104.44 | 10.0 | 18.33+ | 41.67 | 37.78 | 33.33 | 76 | 198 |
| R-22/124 ($w_{22}$ = 0.76) | 1.06 | 0.93 | 100.0 | 11.11+ | 18.89 | 41.11 | 37.22 | 32.78 | 80 | 203 |

Inlet Evaporator Temperature = 8° C.
Inlet Condenser Temperature = 44° C.

Alternatively, in the heating mode the system can be operated with this composition at higher condenser temperatures to obtain similar efficiencies as for R-22 and higher outlet temperatures (2.22°-2.78° C.) for the heated condenser fluid. Improvements in efficiencies or condenser temperature levels have also been found for this composition for heating mode conditions with an inlet evaporator temperature of −17.78° C. and an outlet condenser temperature of 48.89° C.

If higher evaporator and condenser temperature rises and lower capacities can be tolerated, further improvements in efficiencies and condenser temperature levels can be obtained with lower weight fractions of R-22, as shown in the drawing, for heat pump applications.

For automotive air conditioning applications, the preferred range for this refrigerant composition is at lower weight fractions of R-22 ($w_{22}$ ranging from about 0.01 to less than about 0.6), to obtain pressures similar to those utilized for R-12. With an inlet evaporator temperature of 4.44° C. and a nominal condenser temperature of 65.56° C., R-22/124 ($w_{22}=0.4$) results in an increase of 3% in COP and 7% in capacity with a 5° C. decrease in discharge temperature. For R-22/152a ($w_{22}=0.4$) an improvement in capacity of 11% results with a comparable efficiency as R-12.

From the above, it can be seen that the present invention also provides a method for producing refrigeration and also provides a method for producing heating. These methods include the steps of condensing the refrigerant composition of the present invention and thereafter evaporating the composition. For producing refrigeration, the composition is evaporated in the vicinity of a body to be cooled, and for producing heating, the composition is condensed in the vicinity of a body to be heated.

Specific examples of the present invention will now be set forth. Unless otherwise stated, all percentages are by weight, and all processing steps are conducted at ambient temperature and pressure. It is to be understood that these examples are merely illustrative and in no way to be interpreted as limiting the scope of the invention.

EXAMPLE 1

Using a liquid calorimeter system having a compressor designed to operate with fluids having properties similar to R-22, a refrigerant composition containing 81% R-22 and 19% R-124 is determined to have a relative COP of 1.054 as follows. The refrigerant composition enters the evaporator at 7.78° C. and is heated in the evaporator to 18.33° C., with further superheating to about 26.67° C. at the compressor inlet. The compressor compartment is controlled at 32.22° C. The compressed gas enters the condenser at a nominal temperature of 43.89° C. and is condensed and subcooled to 35° C. before entering the expansion valve. The value determined for relative COP is shown by a circle in the drawing.

EXAMPLE 2

Using the procedure of Example 1, a refrigerant composition containing 76% R-22 and 24% R-124 is found to have a relative COP of 1.062. This value is also shown in the drawing by a circle.

EXAMPLE 3

Using the procedure of Example 1, a refrigerant composition containing 80% R-22 and 20% R-152a is found to have a relative COP of 1.049. This value is shown in the drawing by a triangle.

EXAMPLE 4

Using the procedure of Example 1, a refrigerant composition containing 60% R-22 and 40% R-152a is found to have a relative COP of 1.047. Based on a computer study, an even higher COP is indicated with optimum equipment for this composition.

Industrial Applicability

The refrigerant compositions of this invention are useful in compression cycle applications such as in an air conditioner and in heat pump systems, and are useful for producing both refrigeration and heating.

We claim:

1. A nonazeotropic refrigerant composition comprising from about 99 to 1 wt. % of monochlorodifluoromethane, as a first component, and from about 1 to 99 wt. % of a polar fluorocarbon selected from the group consisting of 2-chloro-1,1,1,2-tetrafluoroethane and 1,1-difluoroethane, as a second component.

2. The composition of claim 1 wherein said second component is 2-chloro-1,1,1,2-tetrafluoroethane.

3. The composition of claim 1 wherein said second component is 1,1-difluoroethane.

4. The composition of claim 2 wherein monochlorodifluoromethane is present in an amount ranging from about 50 to 30 wt. % and said second component is present in an amount ranging from about 50 to 70 wt. %.

5. The composition of claim 3 wherein monochlorodifluoromethane and said second component are present in amounts that produce a nonflammable composition.

6. The composition of claim 1 containing a high weight fraction of said first component.

7. The composition of claim 6 wherein said first component is present in an amount ranging from about 90–70 wt. % and said second component is present in an amount ranging from about 10–30 wt. %.

8. A method for producing refrigeration which comprises condensing the refrigerant composition of claim 1 and thereafter evaporating said refrigerant composition in the vicinity of a body to be cooled.

9. A method for producing heating which comprises condensing the refrigerant composition of claim 1 in the vicinity of a body to be heated and thereafter evaporating said refrigerant composition.

10. The composition of claim 1 containing from about 1 wt. % to less than about 60 wt. % of said first component.

* * * * *